US011965954B2

(12) United States Patent
Blondel et al.

(10) Patent No.: US 11,965,954 B2
(45) Date of Patent: Apr. 23, 2024

(54) APPARATUS AND METHOD FOR MONITORING OBJECTS IN SPACE

(71) Applicant: UNIVERSITY OF BATH, Bath (GB)

(72) Inventors: Philippe Blondel, Bath (GB); Jacques Yves Guigne, Paradise (CA); Carole Mundell, Bath (GB)

(73) Assignee: UNIVERSITY OF BATH, Bath (GB)

( * ) Notice: Subject to any disclaimer, the term of this patent is extended or adjusted under 35 U.S.C. 154(b) by 411 days.

(21) Appl. No.: 16/603,557

(22) PCT Filed: Apr. 3, 2018

(86) PCT No.: PCT/GB2018/050901
§ 371 (c)(1),
(2) Date: Oct. 7, 2019

(87) PCT Pub. No.: WO2018/185478
PCT Pub. Date: Oct. 11, 2018

(65) Prior Publication Data
US 2021/0011148 A1    Jan. 14, 2021

(30) Foreign Application Priority Data
Apr. 7, 2017  (GB) ..................... 1705641

(51) Int. Cl.
*G01S 13/87*    (2006.01)
*B64G 1/10*    (2006.01)
(Continued)

(52) U.S. Cl.
CPC .......... *G01S 13/878* (2013.01); *B64G 1/105* (2013.01); *B64G 3/00* (2013.01); *G01S 13/90* (2013.01);
(Continued)

(58) Field of Classification Search
CPC .... G01S 13/878; G01S 13/9004; G01S 13/90; B64G 1/105; B64G 3/00; B64G 1/1085; B64G 1/66
(Continued)

(56) References Cited

U.S. PATENT DOCUMENTS

| 5,166,755 A * | 11/1992 | Gat ........................ G01J 3/2803 250/226 |
| 5,751,243 A * | 5/1998 | Turpin ...................... G01S 7/51 250/370.08 |

(Continued)

FOREIGN PATENT DOCUMENTS

| EP | 0284075 A2 * | 3/1988 | ............. G01S 13/42 |
| EP | 0284075 A2 * | 9/1988 | ............. G01S 13/42 |

(Continued)

OTHER PUBLICATIONS

SimonsRaineeNetal.:Applicationsofnano-satellitesandcube-satellitesinmicrowaveandRFdomain,2015IEEEMTT-S InternationalMicrowaveSymposium, IEEE, May 17, 2015,pp. 1-4, CP033181519, DOI: 10.1109/MWSYM.2015.7167067.(Year: 2015).*
(Continued)

*Primary Examiner* — Nuzhat Pervin
(74) *Attorney, Agent, or Firm* — McCoy Russell LLP

(57) ABSTRACT

A system for detecting objects in space comprises an array of satellite nodes. The array of satellite nodes comprise at least one transmitter module for transmitting an electromagnetic signal, and a plurality of receiver modules for receiving diffractions from electromagnetic waves scattered from objects in space. The system comprises a control module for focussing the plurality of receiver modules to receive diffractions from a focussed virtual aperture in space.

22 Claims, 14 Drawing Sheets

(51) Int. Cl.
  *B64G 1/66* (2006.01)
  *B64G 3/00* (2006.01)
  *G01S 13/90* (2006.01)

(52) U.S. Cl.
  CPC ........ *G01S 13/9004* (2019.05); *B64G 1/1085* (2013.01); *B64G 1/66* (2013.01)

(58) Field of Classification Search
  USPC .......................................................... 342/59
  See application file for complete search history.

(56) References Cited

U.S. PATENT DOCUMENTS

| | | | | |
|---|---|---|---|---|
| 6,002,360 | A * | 12/1999 | Wolcott ................. | H01Q 1/288 455/13.1 |
| 6,219,185 | B1 * | 4/2001 | Hyde ..................... | B64G 1/286 359/566 |
| 8,193,968 | B1 * | 6/2012 | Kia ........................ | B64G 3/00 342/26 A |
| 8,612,278 | B1 * | 12/2013 | Ashley, Jr. ............. | H04W 4/80 705/7.11 |
| 9,134,538 | B1 * | 9/2015 | Augst .................... | H01S 5/4062 |
| 9,435,884 | B2 * | 9/2016 | Inoue ..................... | G01S 13/56 |
| 9,654,222 | B1 * | 5/2017 | Shatz ..................... | G06F 3/14 |
| 9,726,771 | B1 * | 8/2017 | Popovici ................ | G01V 1/345 |
| 9,755,740 | B2 * | 9/2017 | Shatz ..................... | H04N 23/62 |
| 9,859,959 | B2 * | 1/2018 | Derneryd .............. | H04B 7/0408 |
| 9,871,588 | B2 * | 1/2018 | Shatz ..................... | H04M 1/737 |
| 9,998,221 | B2 * | 6/2018 | Boroson ................ | H04B 10/118 |
| 10,096,498 | B2 * | 10/2018 | Pullens ................. | B23K 26/064 |
| 11,115,111 | B1 * | 9/2021 | Bakr ..................... | H04W 36/30 |
| 2002/0050942 | A1 * | 5/2002 | Grisham .............. | G01S 13/9023 342/25 C |
| 2004/0031058 | A1 * | 2/2004 | Reisman ............. | H04N 21/4143 348/E7.071 |
| 2007/0146634 | A1 * | 6/2007 | LeBlanc ................ | A61B 3/156 351/221 |
| 2007/0250267 | A1 * | 10/2007 | Jaeger ................... | H04B 7/195 701/531 |
| 2008/0186390 | A1 * | 8/2008 | Sato ...................... | G06T 3/4053 348/222.1 |
| 2009/0080194 | A1 * | 3/2009 | Bouzid ................. | A61B 5/0071 362/277 |
| 2009/0102701 | A1 * | 4/2009 | Mountcastle ........... | G01S 7/415 342/180 |
| 2010/0207884 | A1 * | 8/2010 | Grot ...................... | G06F 3/0317 345/166 |
| 2011/0302906 | A1 * | 12/2011 | Sinko .................... | B64G 1/646 60/204 |
| 2012/0020515 | A1 * | 1/2012 | Robinson ............. | G06V 10/255 382/103 |
| 2012/0092650 | A1 * | 4/2012 | Gunn, III ............ | G01N 21/7746 356/402 |
| 2012/0112093 | A1 * | 5/2012 | Rosen ....................... | G01J 3/44 356/369 |
| 2013/0099968 | A1 * | 4/2013 | Katz ...................... | G01S 19/12 342/357.65 |
| 2014/0210983 | A1 * | 7/2014 | Shimura ............... | G02B 21/361 348/80 |
| 2016/0041092 | A1 * | 2/2016 | Urano .............. | G01N 21/95623 356/237.5 |
| 2016/0157828 | A1 * | 6/2016 | Sumi ..................... | G01N 29/46 702/189 |
| 2017/0026147 | A1 * | 1/2017 | Smith .................... | G01S 13/878 |
| 2017/0052024 | A1 * | 2/2017 | Reece, Jr. et al. ..... | G01B 11/24 |
| 2017/0093475 | A1 * | 3/2017 | Smith .................... | H04B 7/022 |
| 2017/0193300 | A1 * | 7/2017 | Shatz ................... | G02B 19/009 |
| 2017/0195044 | A1 * | 7/2017 | Shatz .................... | H04B 10/60 |
| 2017/0195045 | A1 * | 7/2017 | Shatz ................. | H04B 10/1141 |
| 2017/0195050 | A1 * | 7/2017 | Shatz ................. | G02B 19/0009 |
| 2017/0302364 | A1 * | 10/2017 | Cesarano ................ | G08G 9/02 |
| 2017/0302374 | A1 * | 10/2017 | Shatz .................... | H04M 1/737 |
| 2018/0106898 | A1 * | 4/2018 | Baskaran .............. | G01S 7/4802 |
| 2018/0156924 | A1 * | 6/2018 | Reedy ................... | B64G 1/443 |
| 2018/0157930 | A1 * | 6/2018 | Rutschman .......... | B64G 1/1021 |
| 2018/0354658 | A1 * | 12/2018 | Rossettini ............... | B64G 1/26 |
| 2019/0129026 | A1 * | 5/2019 | Sumi ................... | G01S 7/52038 |
| 2019/0297671 | A1 * | 9/2019 | Perdomo .............. | H04L 41/082 |
| 2019/0339378 | A1 * | 11/2019 | Zwirn ................. | G01S 13/878 |
| 2021/0120514 | A1 * | 4/2021 | O'Shea ................ | G01S 5/02 |
| 2021/0389439 | A1 * | 12/2021 | Sumi ................. | G01S 15/8915 |
| 2023/0298145 | A1 * | 9/2023 | Miscuglio ................ | G06N 3/08 382/279 |

FOREIGN PATENT DOCUMENTS

| | | | |
|---|---|---|---|
| EP | 0284075 A2 | 9/1988 | |
| WO | WO-2017149526 A2 * | 9/2017 | ........... G01B 11/026 |

OTHER PUBLICATIONS

Mehrholz, D. et al., "Detecting, Tracking and Imaging Space Debris," European Space Agency Bulletin, No. 109, Feb. 2002, 7 pages.
Simons, R. et al., "Applications of Nano-Satellites and Cube-Satellites in Microwave and RF Domain," Proceedings of the 2015 IEEE MTT-S International Microwave Symposium, Jul. 27, 2015, Phoenix, Arizona, 4 pages.
Great Britain Intellectual Property Office, Search Report under Section 17(5) Issued in Application Serial No. GB1705641.7, dated Oct. 10, 2017, 4 pages.
ISA European Patent Office, International Search Report and Written Opinion Issued in Application Serial No. PCT/GB2018/050901, dated Jun. 21, 2018, WIPO, 26 pages.

* cited by examiner

APPARATUS AND METHOD FOR MONITORING OBJECTS IN SPACE

TECHNICAL FIELD

The embodiments described herein relate to an apparatus and method for monitoring objects in space, for example an apparatus and method for detecting, imaging or tracking objects in space, for example debris or other small objects in space, including satellites.

BACKGROUND

With the forever increasing number of satellites and other spacecraft being launched into space, it is becoming increasingly important to monitor objects in space, for example to detect and assess the shape and size distributions of space debris, which include for example fragments of satellites and rocket bodies left in the orbit of the earth. This is an important task in evaluating the possibility of space debris colliding with future operational spacecraft. With the increasing usage of space and resulting break-up of materials into smaller debris fields, the mapping of such targets has become a very difficult evaluation task. With the increased access to space by small nations and private enterprises, the potentially unregulated deployment or jettisoning of small objects is also likely to become an important issue and will need monitoring.

Based on a publically released bulletin in February 2002 by D. Mehrholz, L. Leushacke of the FGAN Research Institute for High-Frequency Physics and Radar Techniques, Wachtberg, and by W. Flury, R. Jehn, H. Klinkrad, M. Landgraf of the European Space Operations Centre (ESOC), Darmstadt, Germany, there are currently more than 8700 objects larger than 10-30 cm in Lower Earth Orbit (LEO) and larger than 1 m in Geostationary Orbit (GEO), registered in the US Space Command Satellite Catalogue.

FIG. 1, taken from the paper above, shows the history of catalogued objects in orbit over the decades leading up to the end of the last century, and these numbers have continued to increase since.

It is also disclosed and well known that US Space Command tracks these objects with ground based radars and optical telescopes to determine their orbits and other characteristic parameters, including their sizes. From the 2002 bulletin and other open literature, approximately 6% of objects in space are operational spacecraft, 21% are old spacecraft, 17% are rocket upper stages, 13% are mission-related debris, and 43% are fragments from (mostly) explosions or collisions. Consequently, about 94% of the catalogued objects no longer serve any useful purpose and are collectively referred to as "space debris". In addition, there are a large number of smaller objects that are not routinely tracked, with estimates for the number of objects larger than 1 cm ranging from 100,000 to 200,000.

Since 2002, the severity of the space-debris situation has exponentially increased. To aid in the mitigation problem of having debris collide with future space satellite and manned spacecraft activities, various space-debris environmental models have been created by various space agencies. The effectiveness of the models and any future active satellite based debris removal mitigation measures to be employed requires detailed descriptions of the spatial particle distribution as a function of its size, origin or nature and location in space. These mathematical tracking space-debris models have to be validated with measurement data. However, there is currently no mechanism for measuring or quantifying space debris.

SUMMARY

It is an aim of the present invention to provide a method and apparatus which obviate or reduce at least one or more of the disadvantages mentioned above.

According to a first aspect of the present invention there is provided a system for detecting objects in space, for example space debris or small objects. The system comprises an array of satellite nodes. The array of satellite nodes comprises at least one transmitter module for transmitting an electromagnetic signal, and a plurality of receiver modules for receiving diffractions from electromagnetic waves scattered from objects in space. The system comprises a control module for focussing the plurality of receiver modules to receive diffractions from a focussed virtual aperture in space.

The at least one transmitter and at least one receiver may be adaptively or dynamically controlled to provide an antenna array that can be adapted to control the focussed virtual aperture in space.

According to another aspect of the present invention there is provided a system for assessing objects in space. The system comprises an array of satellite nodes, wherein the array of satellite nodes comprise at least one transmitter module for transmitting an electromagnetic signal, and a plurality of antenna elements for receiving diffractions from electromagnetic waves scattered from objects in space. The system comprises a control module for controlling the plurality of antenna elements to receive diffractions from a focussed virtual aperture in space, and an imaging module to assess a target object based on the signals received from the plurality of antenna elements.

According to another aspect, there is provided an imaging system for imaging objects. The imaging system comprises an array of satellite nodes, wherein the array of satellite nodes comprise at least one transmitter module for transmitting an electromagnetic signal, and a plurality of receiver modules for receiving diffractions from electromagnetic waves scatted from objects in space. The imaging system comprises an imaging unit for generating an image of a target object from the diffractions received at the plurality of receiver modules.

According to another aspect there is provided a method for detecting objects in space using an array of satellite nodes. The method comprises transmitting an electromagnetic signal from at least one transmitter module in the array of satellite nodes, and receiving diffracted signals from electromagnetic waves scattered from objects in space via a plurality of receiver modules in the array of satellite nodes. The method comprises focussing the plurality of receiver modules to receive diffractions from a virtual aperture in space, to detect an object within the virtual aperture.

According to another aspect, once the data from multiple aspects has been gathered, it is possible to dynamically create a virtual beamformer and sweep into the data, creating virtual pencil beams from which high-resolution imagery can be formed.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

The following sets forth specific details, such as particular embodiments for purposes of explanation and not limitation. But it will be appreciated by one skilled in the art that other embodiments may be employed apart from these specific details. In some instances, detailed descriptions of well-known methods, principles, circuits, and devices are omitted so as not obscure the description with unnecessary detail.

The embodiments described herein relate generally to the field of electromagnetic imaging and its use for the specific evaluation of objects such as debris fields and targets that are present in space. More specifically, the embodiments relate to an apparatus and method for determining electromagnetic attributes related to specific imaged targets in orbit to a relatively high lateral and vertical resolution whilst operating off an array of satellites also placed in Lower Earth Orbit (LEO) but which could also be placed in larger orbits, including Geosynchronous Orbit (GEO), or in intermediate orbits between LEO and GEO, or orbits beyond GEO, or in any general orbit around any planetary body.

Figure 1:
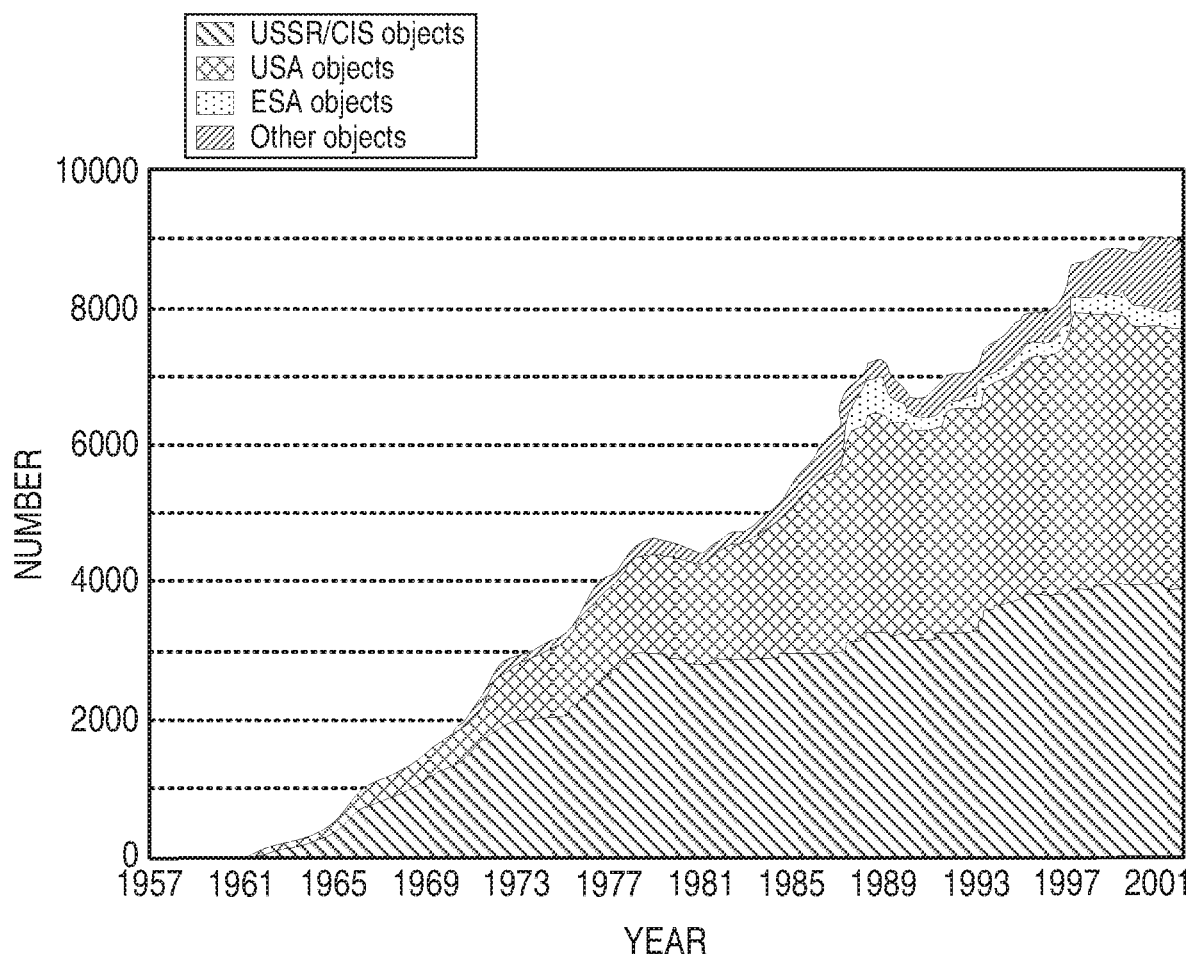
FIG. 1 shows a history of catalogued objects in orbit.
Figure 2A:
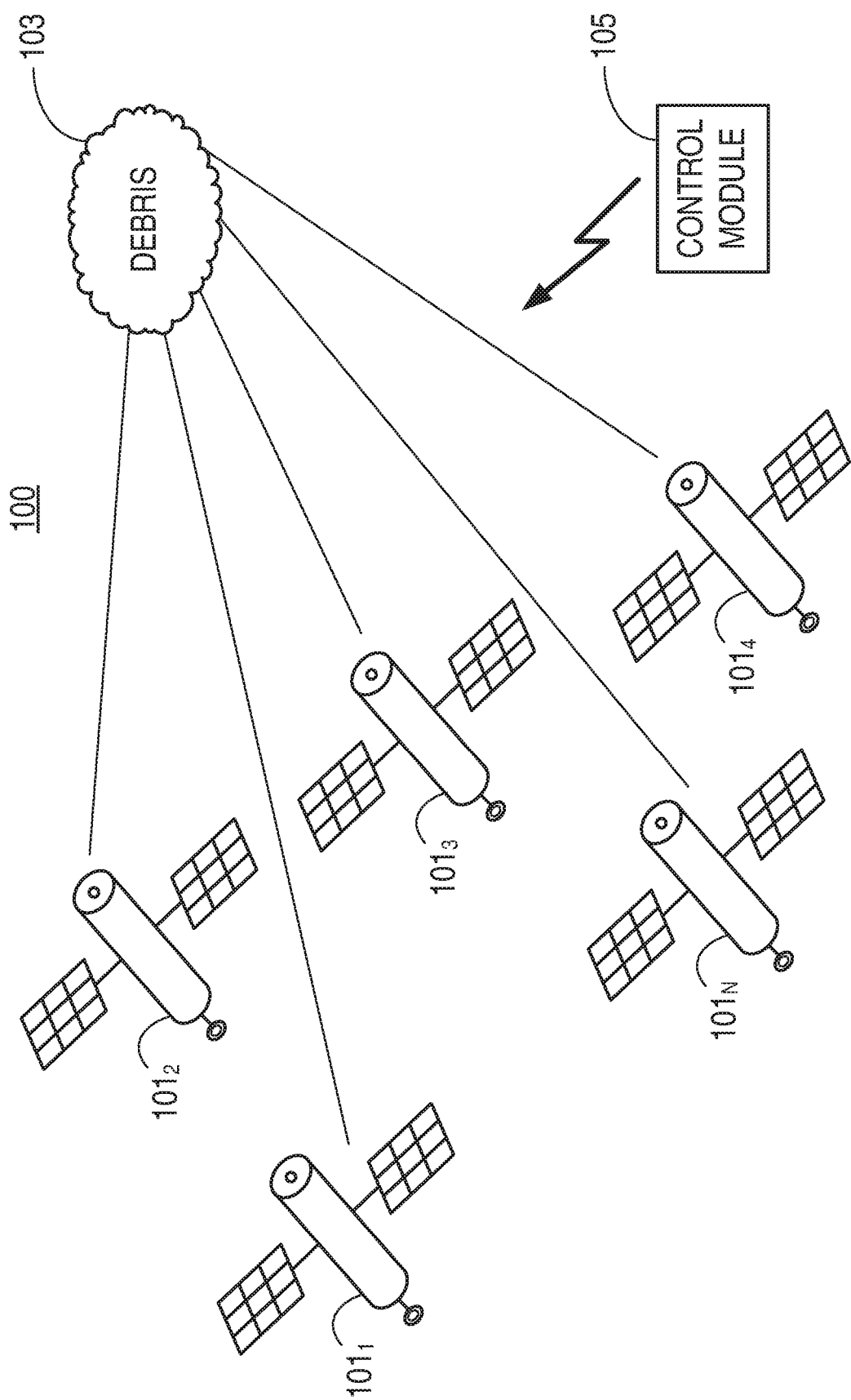
FIG. 2a shows an example of a system according to an embodiment, using satellite nodes along one particular orbit.

FIG. 2a shows an example of a system 100 for detecting objects in space according to a first embodiment, for example detecting an object such as space debris or small object 103, including for example nanosatellites. The system 100 comprises an array of satellite nodes $101_1$ to $101_N$. The array of satellite nodes comprises at least one transmitter module 107 (not shown) for transmitting an electromagnetic signal, and a plurality of receiver modules 109 (not shown) for receiving diffractions from electromagnetic waves scattered from objects in space. The system 100 comprises a control module 105 for focussing the plurality of receiver modules 109 to receive diffractions from a virtual aperture in space.

For example, one of the satellite nodes within the array, e.g. satellite node $101_1$, may comprise a transmitter module 107 (not shown) for transmitting an electromagnetic signal, while a plurality of other satellite nodes within the array, e.g. satellite nodes $101_2$ to $101_N$, comprise receiver modules 109 (not shown) for detecting diffracted signals that have been scattered from any objects in space which are located within the virtual aperture.

In another example, each satellite node $101_1$ to $101_N$ may comprise a transmitter module, for example such that a particular satellite node 101 that best suits a particular application or monitoring process can be selected for transmission of the electromagnetic signal. In some embodiments, multiple transmitter modules 107 may be activated to create multiple electromagnetic signals, for example which are activated in a particular pattern or series. In some examples, positive/destructive interference may be used between sources to induce high signals in places of interest and null signals in other places. This can be used to maximize the energy scattered by targets of interest, or to ensure the imaging process is not detectable in other volumes of space (e.g. to avoid electromagnetic interference on sensitive equipment, including third-parties, or for "stealth" imaging). The control module 105 may therefore be configured to control a plurality of transmitter modules, for example to beamsteer the electromagnetic signals transmitted from the transmitter modules.

Each satellite node $101_1$ to $101_N$ may comprise a receiver module, for example to maximise the possible number of different configurations of the plurality of satellite nodes that are selected to form an antenna for focussing on the virtual aperture, and receiving the diffracted signals. By having a receiver module 109 on each satellite node $101_1$ to $101_N$, this enables the range of different receiver module configurations to be maximised when the receiver modules 109 act as separate antenna elements forming part of a larger antenna. It is noted, however, that the invention also embraces receiver modules being located on a sub-set of the satellite nodes $101_1$ to $101_N$.

In some examples, each satellite node $101_1$ to $101_N$ comprises a transceiver module 107/109, i.e. comprising a transmitter and receiver, such that any satellite node within the array can transmit an electromagnetic signal, receive diffracted signals, or both.

The control module (105) may comprise a dynamic beamformer that is adaptively configured to sweep into data virtual pencil beams to form imagery from data received from the plurality of receiver modules.

The satellite nodes $101_1$ to $101_N$ of FIG. 2a may be arranged in the same orbit. However, it is noted that different satellites nodes of the array of satellite nodes $101_1$ to $101_N$ may be arranged in one or more different orbits.

Figure 2B:
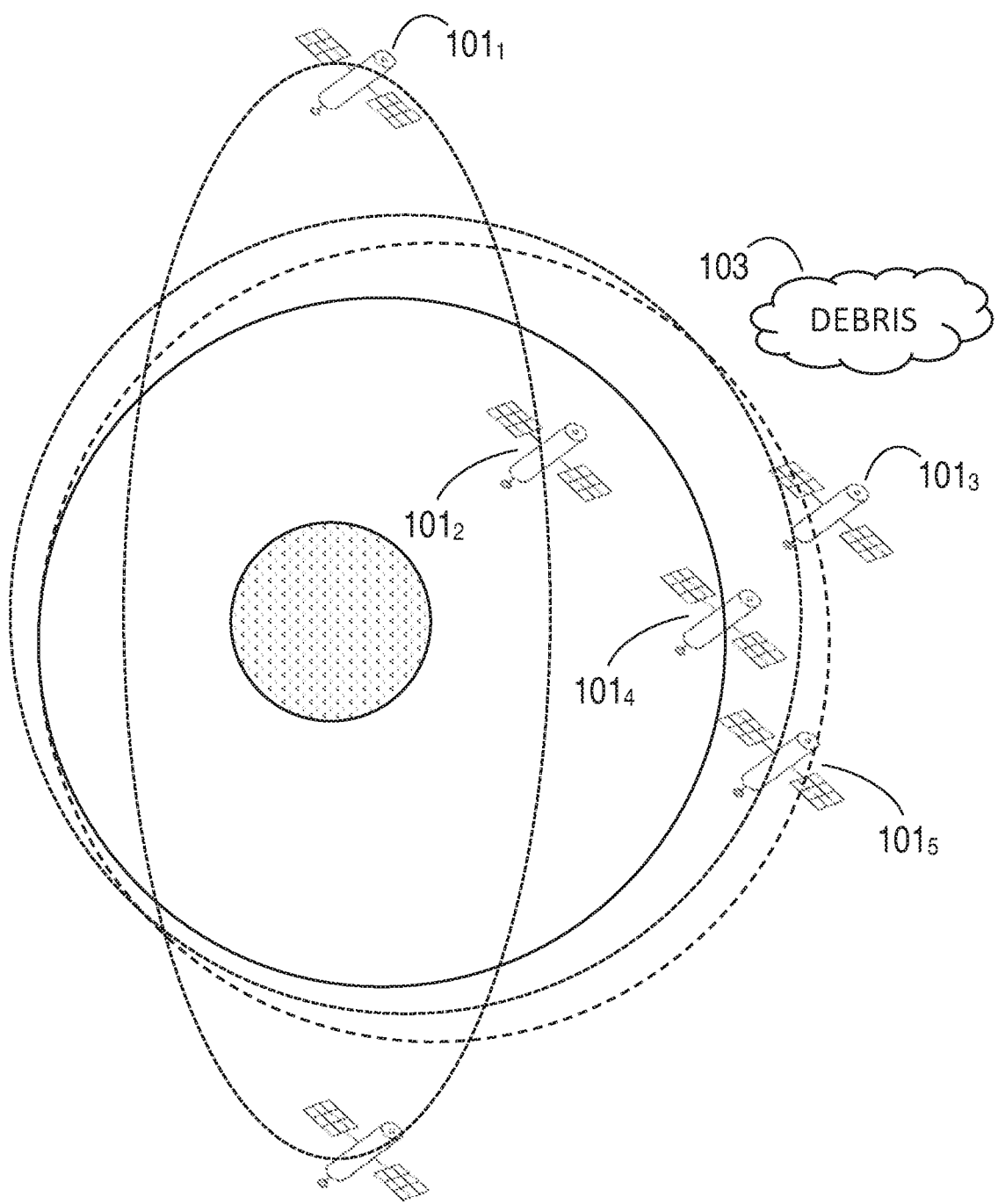
FIG. 2b shows an example of a system according to another embodiment, using satellite nodes in different orbits.

For example, FIG. 2b shows an example in which different satellite nodes $101_1$ to $101_5$ are arranged to be in different orbits.

The array of satellite nodes $101_1$ to $101_N$ of FIGS. 2a and 2b may be arranged to create two dimensional or three dimensional arrays of satellite nodes. The arrays can also be configured to change dynamically during use.

Figure 3:
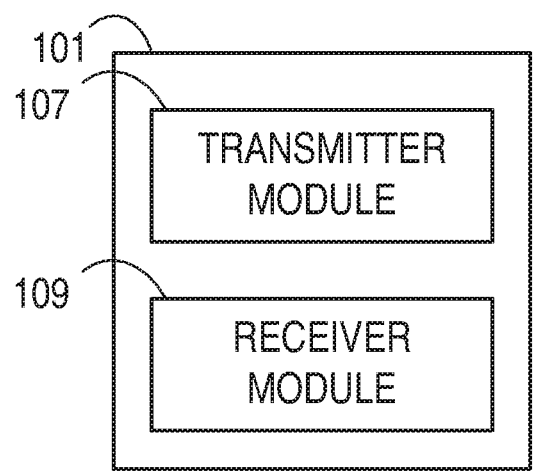
FIG. 3 shows an example of a satellite node for use in the system of FIGS. 2a and 2b.

FIG. 3 shows an example of such a satellite node 101, comprising a transmitter module 107 and a receiver module 109.

In yet another example, a satellite node 101 may comprise a plurality of transmitter modules 107 and/or a plurality of receiver modules 109, for example so that a plurality of receiver modules on the same satellite node can form part of antenna elements for a larger antenna, or merely to provide failure back-up for a transmitter module 107 or receiver module 109.

In view of the above, an individual satellite node 101 within the array of satellite nodes comprises: a transmitter module 107; or a receiver module 109; or a transceiver module 107/109; or a plurality of transmitter modules 107 and/or receiver modules 109.

As mentioned above, a plurality of receiver modules 109 act together to form a larger antenna, for receiving diffracted signals which have been diffracted from a target object in response to an electromagnetic signal (or series of electromagnetic signals) which has been transmitted towards the target object.

It is noted that although the control module 105 of FIG. 2a is shown as a separate entity, the control module 105 may in fact be located on one of the satellite nodes $101_1$ to $101_N$ in the satellite array, for example a master satellite node. Alternatively, the functions of the control module 105 may be distributed among a plurality of satellite nodes within the satellite array (including for example all of the satellite nodes). For example, individual processors may be co-located with antenna elements on the satellite nodes. In another embodiment, part or whole of the function of the control module 105 is located in a ground based node, and/or in a cloud based node.

The control module 105 may be configured to control the position of a plurality of satellite nodes $101_1$ to $101_M$ within the array of satellite nodes $101_1$ to $101_N$, relative to one another. In one example, the relative positions of all of the satellite nodes $101_1$ to $101_N$ in the array are controlled relative to one another. The relative positions of the plurality of satellite nodes $101_1$ to $101_M$ may be controlled dynamically, including from within the array itself (e.g. in a self-organised manner). This may also include the use of artificial intelligence or neural networks with learning algorithms, as will be described later in the application.

The relative positions may be controlled such that the control module 105 can be configured to adaptively tune the array of satellite nodes $101_1$ to $101_N$ such that the plurality of receiver modules 105 are focussed towards the virtual aperture for monitoring a specific area within a larger viewing or object field in space.

In one embodiment, the receivers are specifically designed to be adaptive and able to be dynamically tuned to form in their orbit locations at specific time stamps a virtual receiver aperture or lens in space such that the receiver elements in this dynamic array can listen in and in an adaptive manner be focused, thus capturing from multi-views diffracted signals off of specific debris targets. The array is formed dynamically because it is operating from moving satellite positions in various positions in orbit. Through high speed array element tracking computations the virtual aperture can focus and steer a set of interrogative but highly precise beams to targets via phased array signal processing methods.

Each target image is formed by the totality of the energy backscattered in the direction and range of the corresponding beam being captured. The image formation relies on the physics of energy propagation interacting with a target and is consistent with elastodynamic wave theory. The algorithm may comprise a search-and-detect type of approach, which may be based, for example, on Kirchhoff migration/linearized Born inversion with a detection feature. Moreover, in the processing of the returned signals spatial filters can be applied to suppress the specular reflections coming off a target once captured, to allow for the weaker diffused energy to be better revealed. Such an embodiment can use specific data acquisition geometry targeting back-scattering as well as utilization of reflection suppression/destruction filters to further accentuate the non-specular edge/tip of targeted diffractions. Moreover, the addition of multi-beam multi-aspect sweeps to the data collection can help improve the likelihood of detailed imaging and distinct separation/identification of the spatial distribution of the debris.

It is noted that each satellite node $101_1$ to $101_N$ may also include lasers such that their firing, alone or in particular patterns and directions, can be used to transfer momentum to other nodes, changing their relative position to refocus the array or change its pattern as needed. In this way photon pressure may be used to dynamically alter the physical configuration of the array, for example in case some nodes have drifted too far away after some time, or to give hard access to array configurations not accessible through the software options mentioned above.

The control module 105 may be configured to control the array of satellite nodes $101_1$ to $101_N$ to sweep the virtual aperture through a larger object field, e.g. to try and locate or detect an object in space. In this way the receiver modules can be arranged to scan a large area for space debris, but obtain more detailed information in view of the diffracted signals being gathered from a smaller area, i.e. the virtual aperture. Once a target object is detected, the plurality of receiver modules 109 can then be controlled to scan the virtual aperture over the target object, to obtain more information about the target object. In one example, in order to ensure maximal success, an oversampled source and receiver array approach is created as the antenna orbits differentially. The size of the virtual aperture may be changed at different times as part of its iterative interrogation ability. This provides the imaging method with multi-aspect transmit and receive arrays to better identify the character of a debris field. Then, in an intelligently controlled manner, neural networks and artificial intelligence can be used to focus in on specific targets to further accentuate the debris responses, thus providing for a unique means to establish attributes to characterize. From the above, changing the size of the virtual aperture and the resolution cells within the volumes being imaged can be used to ascertain more of the scattering by the target object, at different resolutions but also from different angles.

When sweeping a particular area of a larger object field, or sweeping over a detected target object, the control module 105 can be adapted to sweep the virtual aperture such that it follows a tracking pattern. Furthermore, the control module 105 can be adapted such that the tracking pattern takes into account the movement or trajectory of the target object, such that the plurality of receiver modules 109 can be controlled to track a moving target object, which is itself moving in relation to the plurality of receiver modules 109. For example, on each satellite for both the transmitters and for the receivers, atomic clocks can be built into their circuitry to enable synchronization in time and location to be precisely calculated, and tracked using tracking modelling to aid in the beam forming from the various elements used in the beam forming, be it in the transmission or receiving of signals. This allows for adaptive element commands to be given to adapt the sweeping beams within this dynamic virtual array. The tracking may be performed, for example, from a land based station which computes in real time the exact orbital position and orbit path of each satellite in the array (or swarm) which forms the virtual aperture, such that the adaptive beam forming that is created at any time stamp can be predicted and used in the signal processing to form the debris imagery with exactitude.

When close enough to a land-based station, the atomic clocks of such a land-based station may be used to validate and synchronise on-board clocks on the satellite array. This can help compensate if any of the atomic clocks in orbit start to drift. In low orbits, on-board clocks may also be synchronised with reference to satellite positioning networks found below (e.g. GPS, Galileo, Glonass, Global Navigation Satellite System, GNSS, BeiDu), who will "leak" a large portion of their signals into space above. Further in space, self-checking of atomic clocks by the different nodes will allow, for example through majority voting, detection of clocks drifting from nominal accuracies, and by comparison between nodes, correct for trajectories or differences in data acquisition synchronicity. Using these techniques the array of satellite nodes will have absolute positions relative to each other, and can compare their individual positions to a source further away (e.g. earth-based radio source or satellite on a smooth orbit around a particular planet). It is noted that optimization of multiple positioning solutions may also use other techniques, such as simulated annealing or 4-D variability.

Thus, the embodiments described herein, having antenna arrays with adaptive receivers, form a synthetic aperture imager that acquires distinguishing non specular or diffused characteristic data about a debris field and particles and objects contained in that debris field, which can be used to increase the understanding of space debris or other objects in space, and which can be used, for example, to more accurately model the position and behaviour of orbiting space debris/objects. This has an advantage of allowing for more effective monitoring of orbiting debris/object threats to existing orbiting satellites.

Figure 4A:
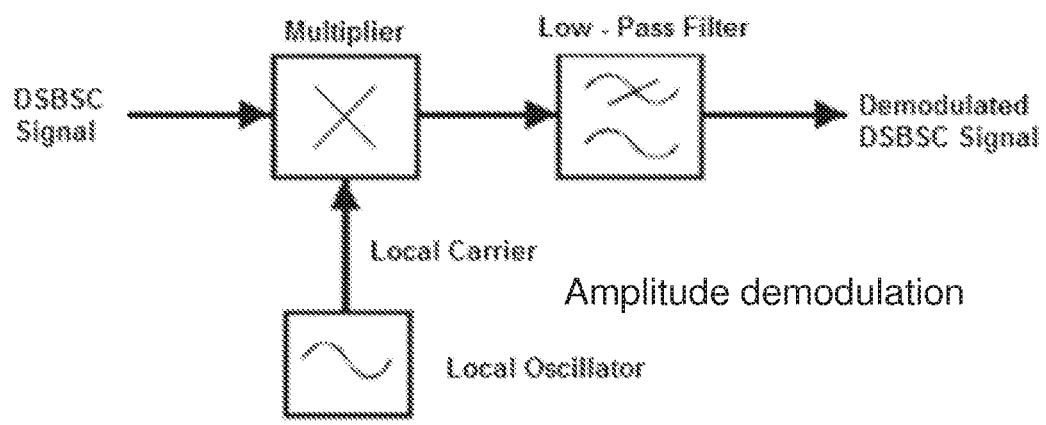
FIGS. 4a to 4c show examples of modulation schemes that may be used with embodiments.
Figure 4B:
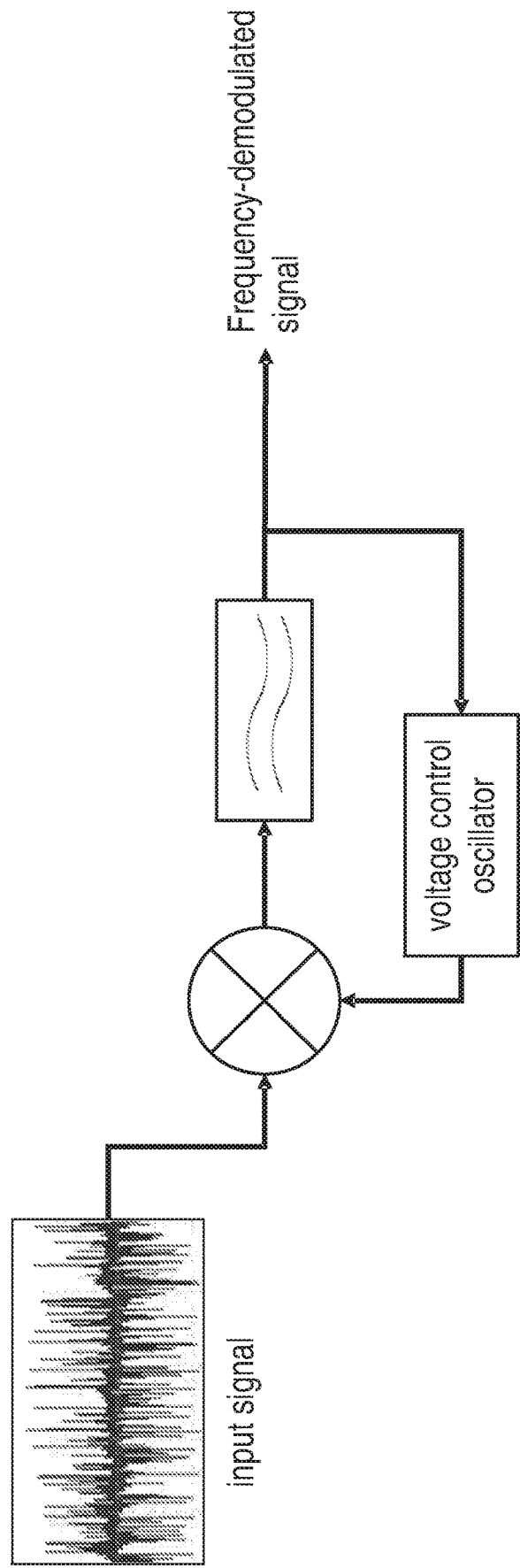
Figure 4C:
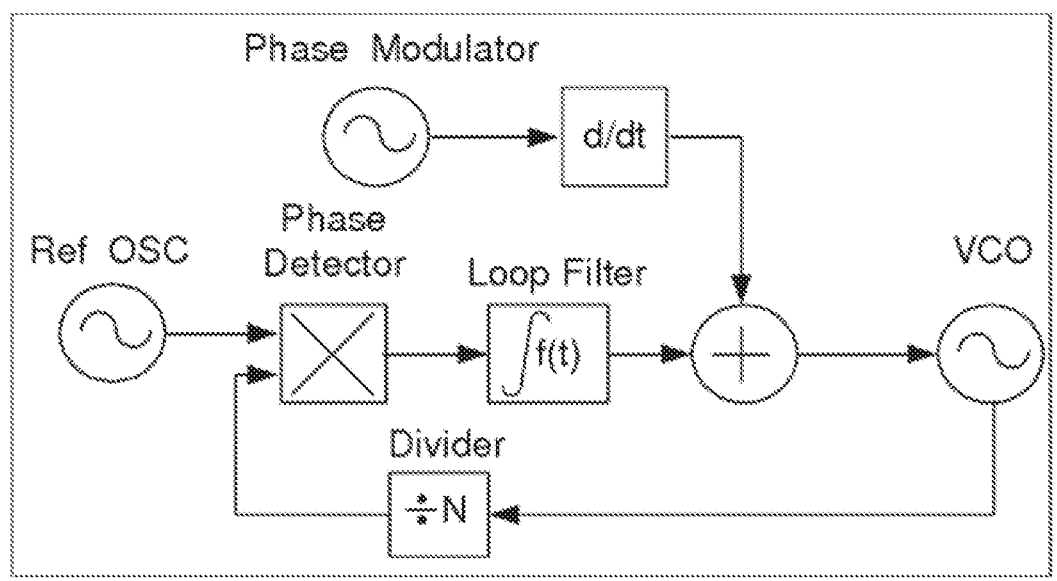

It is noted that transmitted electromagnetic signals can be coded, for example using amplitude, frequency and phase parameters to modulate the electromagnetic signal, as will be familiar to a person skilled in the art. FIGS. 4a, 4b and 4c show examples of different encoding schemes that may be used. Other coding schemes may also be used, including the use of chaotic signals, to create signals hard to distinguish from the background noise (if eavesdropping) but amenable to target characterization (for the transmitting party, who knows the characteristics of the chaotic signal emitted).

The received signals are processed to generate an image corresponding to at least one point on a target object of interest, e.g. space debris. The processing may include stacking the recordings from each receiver module for a plurality of actuations of the source/sources, and beam steering in response to the needs of focusing algorithms that use accurate known location and positioning of the satellite nodes that carry the individual receiver modules, such that at least one image point is equivalent to a focal point of a response of the plurality of receivers associated to the debris targets.

Because the target object is drifting, and the antenna elements (receiver modules) are also drifting, the location of each transmitter module 107 and receiver module 109 is registered precisely, e.g. from GPS signals, in synchronisation with a specific time stamp.

The control module 105 of FIG. 2a may be configured to actuate the at least one transmitter module 107 periodically, and control the plurality of receiver modules 109 such that signals received at the plurality of receiver modules are indexed in time with respect to each actuation of the at least one transmitter module 107.

The control module 105 receives time indexed signals from the plurality of receiver modules 109, and processes the received signals to form an image of a target object, using position information relating to the at least one transmitter module 107 and plurality of receiver modules 109.

Having an adaptive changing array in space with exactly located elements when data is captured allows for the processing to beamform through a specific antenna pattern though in flux. This allows for a parallel modelling task to take place, which can guide the focusing routines. It can also take into account the effects of varying element placements for carrying out the beamforming in the data, aiding in the application of corrections. The use of GPS/GNSS signals will cover applications within the GPS Terrestrial Service Volume (up to 3,000 km high) and the GPS Space Service Volume (3,000 km high to 36,000 km high), covering Low Earth Orbits to Geosynchronous Orbits. Applications in deeper space and close to planets and asteroids are technically possible, with a potential decrease in resolution unless using local, bespoke positioning satellite arrays.

The dynamic sensing antenna array of the embodiments described herein for imaging space debris is in contrast to conventional radar based methods and to optical based Doppler interferometry, with radars typically being applied for the characterization of debris in LEO. Conventional ground based optical based telescopes are directed for more distant orbital region observations such as within the geostationary ring.

The beamforming according to the embodiments described herein tackles the discrete scattering points of space debris, which tends to follow a spin motion around their major axis. By creating a synthetic or virtual aperture through the placement of select transmitting, i.e. transmitter module(s) 107, and associated sensor elements of the antenna, i.e. receiver modules 109, that drift, and by precisely knowing the location of each element of the forming synthetic aperture, the resultant dynamic array, which travels along a projected trajectory (which in some embodiments can be influenced and guided and changed by a propulsion system resident on each of the satellite nodes 101 that carries a sensor or transmitter), allows for a number of electromagnetic pings to form an image with much higher along-track resolution than could be considered from a stationary fixed telescope, either ground based or in space.

Figure 5:
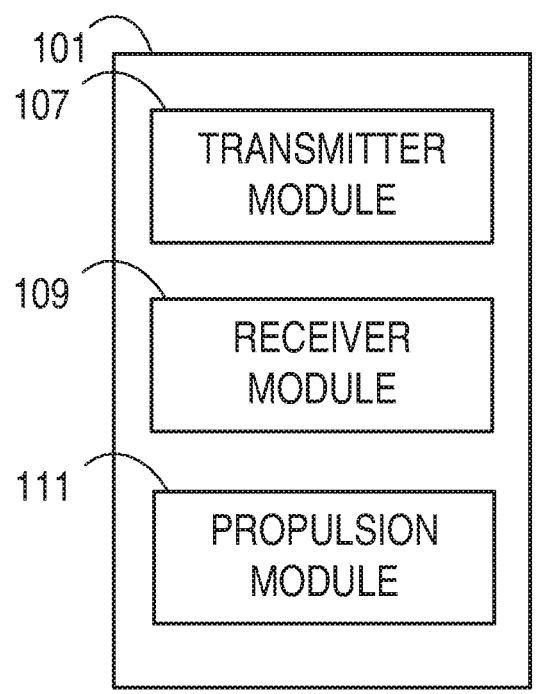
FIG. 5 shows another example of a satellite node for use in the system of FIG. 2a or 2b.

FIG. 5 shows an example of another type of satellite node 101, which in addition to comprising a transmitter module 107 and a receiver module 109, further comprises a propulsion module 111 for enabling the relative position of a satellite node 101 to be controlled within the array of satellite nodes $101_1$ to $101_N$. As mentioned earlier, in other embodiments a satellite node 101 may comprise just a transmitter module 107 and a propulsion module 111, or just a receiver module and a propulsion module 111, or a plurality of transmitter modules 107 and/or plurality of receiver modules 109 in combination with a propulsion module 111 (or a plurality of propulsion modules 111).

A wide range of supporting propulsion technologies may be used as the propulsion modules 111 for a satellite node 101 as shown in FIG. 5, to provide the need for planned on-orbit thruster motion. For example, a propulsion module 111 may comprise a laser module as described earlier, or a chemical propulsion module, which are characterized by low specific impulses and high mass and power budgets, hence being primarily suitable for attitude control, and secondary for trajectory displacements to provide precise orbit placement or manoeuverings of the satellite nodes forming the array. In other examples solar sails may be used with the satellite nodes. According to other embodiments, electric based propulsion modules 111 may be used, for example having high specific impulses, to provide trajectory control. Ferroelectric propulsion technologies may also be used. With their inherent scalability as plasma sources, these thrusters have an advantage of providing small-scale thrusters to manoeuver each satellite node forming the array. Combinations of different propulsion modules may also be used.

Due to the nature of forming in orbit a large diameter virtual (synthetic) aperture, the along-track resolution can approach half the length of one ping element. The embodiments can use the drift and orbiting movement with the aided guidance of on-board programmed propulsion modules 111 on individual satellite nodes 101 to direct and correct, when required, the trajectory of the receiver modules 109. The virtual aperture can then be put to advantage to illuminate the target object through several electromagnetic bursts. The transmitting energy can be made, for example, in the near-field to accentuate the scattering point of each debris, whereby sub-wavelength structures are resolved in the near field, for example within a wavelength (or small number of wavelengths, e.g. two) of the aperture. Typically, electromagnetic waves consist of a magnetic field and an electric field and the characteristics of an electromagnetic field change depending on the distance from the antenna. In one example the near field is less than one wavelength (λ) from the antenna. Wavelength in meters is given by:

λ=300/f in MHz, with the distance from the antenna of the near field calculated as: $\lambda/2\pi = 0.159\lambda$.

It is well explained in physics that the near field is divided into two areas, the reactive and the radiative. In the reactive area, the electric and magnetic fields are the strongest and can be measured separately. One field or the other will dominate, which can be used by the embodiments described herein, for example depending on different antenna types. In the radiative area, the fields begin to radiate and this is the beginning of the far field. In the near field, the strength of the fields varies inversely with the cube of the distance from the antenna ($1/r^3$). The transition zone refers to the area between the near and far fields, whereby typically the far field is defined to begin at a distance of 2λ and beyond. Use of the near field allows smaller objects or debris related scattering cells to be captured with better resolution.

The scattering will differ on each side of the boundary between the near-field and far-field, and some embodiments described herein can make use of both approaches, through the use of the different nodes in the array (transmitters, receivers and transceivers in general).

With the displacement felt within the aperture, coherent reorganization of the received data from all the returns can lead to highly sharpened detection and characterization of certain elements of the target object, for example spatial coordinates that comprise:

the radial velocity of a target object;
the amplitude of a target object; and
the phases of the inherent spectral components.

Hence, the embodiments described herein utilize the independent sensor positions of the plurality of receiver modules 109 with their accurately verified locations at required moments in time to provide an advantage for spatially fine-tuning and sharpening the transmission outputs, and for range—independent along track resolution. Synchronizing the individual receiver modules 109 that form the sensing array with accurate individual GPS/GNSS locations, allows for constructive phasing and shading to deliver narrow beam steering and sharpened beamformed responses.

In other words, the overall antenna formed by the plurality of receiver modules 109 can be adaptively tuned to focus onto the non-specular returns of debris. Through this approach the embodiments can repeatedly capture profiles of a target object and monitor the character of the target object of interest as it evolves in time.

The imagery can also be processed to evolve from a two-dimensional image of the scattering surface to a pseudo three-dimensional rendition that includes in its formation of the third-dimension the motions of the individual scattering points and their distribution in space, which includes the aspect sensitivity of the scattering, and the derived apparent-motion vectors. From the imaging performed by the embodiments, knowledge is gained about the targeted orbital elements and the approximate size of the object (through the beamformed-shaded cross-section).

Energy may be focussed through a migration of the signals, depending on the spacing of the elements and sparsity in populating the aperture. The resulting main lobe can be sharpened to provide for the narrowest main lobe width for a given sidelobe level, thus improving the chances for discriminating the details or features of a target. In a similar way to spectral windowing in a time series analysis, array shading reduces sidelobes resulting from sampling a finite aperture. The shading is examined and defined related to directivity, array gain and signal-to-interference ratios, depending upon the spacing variations and numbers of elements of the array which form the virtual aperture at a given position in orbit and in what orbit the satellites are travelling individually.

According to some embodiments, numerical optimizations and iterative techniques may be used to compute a desired weighting function, for example because analytic solutions may not provide for an exact optimal shading method for the virtual aperture because the satellite based aperture is made up of irregularly spaced or non-coplanar elements similar to a volume array.

In one example, real shading coefficients are computed for the non-uniform, non-coplanar satellite swarm based array by resampling the optimal Dolph-Chebyshev window computed for a plane array at the element position of an irregular array according to an embodiment. Because the array is in space, there may be a degrading of the sensors used over time as elements fail, resulting in high sidelobes. To overcome the effects of the side lobes, shading can be used in the beam patterns associated with just the failed elements, thus controlling the degraded array response in the sidelobe region.

The beamforming described above allows the embodiments to steer the beam to a particular source in 3-D space, using a multiplicity of receivers. In some examples all of the receivers in the array are used, while in other examples only a subset of the receivers are used, for example if it is known that some configurations are better at discriminating shapes and sizes of targets. As mentioned above, the contributions from each receiver can be weighted based on how good the signals are (e.g. amplification to compensate for range attenuation and spreading, accounting for the degradation of signal quality as receivers age or if they are partially masked by debris clouds).

Since these shading coefficients are associated with non-uniform, non-coplanar configurations, this allows for swarms to be divided into sub-swarms, for example on different orbits or at different heights (either because of orbital deployment constraints, or on purpose). While conventional satellites will be on the same orbit, spaced at regular intervals along a line (e.g. such as NASA's A-train satellites), the satellites according to the embodiments described herein comprise more complex configurations, which can be truly 2-D (if confined to the same altitudes) or 3-D (if using different altitudes for different parts of the array). This multi-orbit capability enable a dynamic virtual aperture to be generated, which can be modelled/interrogated to know where the transmit/receive elements are, and which can be reconfigured if required by the task at hand during a particular application.

This versatility in achievable configurations means that the embodiments are not necessarily restricted to LEO or GEO.

After detection of a target object, the target object can be tracked and observation vectors collected, from which the orbital parameters and detection-scattered signature of the target object can be computed, including for example the intrinsic rotation or tumbling rate of the target object.

Thus, in some embodiments the control module 105 is configured to collect observation vectors from the target object. The control module 105 may be further configured to use the observation vectors to generate a target object profile, wherein the target object profile comprises one or more of:

at least one orbital parameter of the target object;
a detection-scatter signature of the target object;
an intrinsic rotation of the target object;
a tumbling rate of the target object.

As mentioned above, the target object profile is based on a radial velocity, amplitude and phase of the inherent spectral components of the target object. The control module 105 can be configured to periodically update a target object profile to monitor the character of the target object as it evolves in time.

This information, as gathered from the array of satellite nodes, can be fed back to an earth based observation post to update models that aid in mitigating uncertainties on an orbit of a specific target object of interest.

In the embodiments described above, the satellite nodes $101_1$ to $101_N$ may comprise any form of satellite. In one example, the embodiments use miniaturized satellite technology, such as the small class of satellites called nano-satellites, for example the CubeSat® specification. Due to their ease of design and low costs in construction, these satellites are well placed to support a plurality of satellites to individually hold the transmitter modules 107 and receiver modules 109 as described above.

Typically the launches of these types of satellites are in conjunction with other payloads and are routinely accommodated as secondary or tertiary payloads along with larger satellites or International Space Station's (ISS) resupply missions. As such, the scheduling, and orbital placement of the satellite nodes $101_1$ to $101_N$ is readily accessible because of their small sizes, and hence fits within the growing commercial payload launches made available by both government funded space agencies and independent commercial and privately funded aerospace companies.

At present the smallest form of CubeSat is approximately a 1-litre box, 10×10×11.4 cm on a side (one unit, 1U, about 1 litre in size), but there are larger satellites available for 2U and 3U with still larger CubeSat variants up to 6U. The mass of such a satellite is typically 1-10 kg. Embodiments of the invention can therefore use nano-satellites, or CubeSat satellites, which are readily available.

As mentioned previously, the array of satellite nodes $101_1$ to $101_N$ may be positioned in lower earth orbit, LEO, or Geosynchronous Orbit, or intermediate orbits between LEO and GEO, or orbits beyond GEO, or in any general orbit around any planetary body.

Further details will now be provided in relation to the electromagnetic measurements performed by embodiments of the invention. Unlike scalar amplitude measurements, the embodiments make use of measurements of the vector electromagnetic field amplitudes. The amplitudes of vector electric and/or magnetic fields are deduced through the manipulation of the processed beam which captures and quantifies in the restricted footprint of the beam (i.e. the virtual aperture) voltage differences induced in the electric and/or magnetic antenna detectors as deployed as receiver modules 109 through the plurality of the satellite nodes forming the array placed in orbit.

The electric and/or magnetic fields are induced in response to the electric field and/or magnetic field imparted on the debris target by the transmission of an electromagnetic signal from at least one transmitter module 107, and inferences about the spatial distribution of conductivity of the target object are made from recordings of the induced electric and/or magnetic fields collected by the plurality of receiver modules 109.

High resolution gains are made by capturing much more subtle electric changes through the sweeping of the antenna's receiver beams as steered through the processing routines fully exploiting the virtual aperture and dynamically shaped antenna array with its associated proximate tunable broad frequency based energy sources. These sources or transmissions are individually beam-steered with temporal stacking to achieve sufficient signal-to-noise for the beamforming and steering to be more easily obtained as stronger signals.

The shaped transmitted fields are obtained by a combination of geometric disposition of the several source current loops together with the controlled phasing of the currents in the loops. For example, as described above in FIG. 2a, the different nodes 101 can be disposed in any geometric configuration, whereby the node (or nodes) transmitting can be made to emit signals with slightly different phases. The physical separations from the emitting node (or nodes) to the target and back to the receiving nodes can then be used to control the phasing, for example using an iterative control.

The embodiments can form as many beams as required, sweeping particular targeted debris and/or a debris field of complex forms of differing fragments or particulates. The resulting images and electromagnetic attributes thus formed at a given location at a beam focusing point or area of interest in the subject target that is being specifically illuminated may have as many independent points as there are independent beams formed.

In some examples iterative focusing strategies are used to enhance and improve the focusing, and thereby further the knowledge of the debris and its orbiting environment. This may comprise, for example, illuminating specific points or areas on the debris surface from different angles with very high resolving strengths. The different angles will be a succession of bistatic angles, between the node used as transmitter (or each node used as one of the transmitters in sequence) and the nodes used as receivers. Beam-steering can be used in the active part (signal transmission), to illuminate specific points or areas or volumes, and beam-forming in the passive part (signal reception) to ensure only reflections from specific points or areas or volumes are taken into account. The exact resolving strength can depend on the number of nodes used (in transmission and separately in reception, for either beam-steering or beamforming) and their separations at the time of the measurements.

The embodiments can focus on the vector propagated fields; highlighting the spatial resolution and the dominance of the propagated wavefield. The range resolutions are selected such that they are of at least in the order of the size of target object which is being sought. Hence, the embodiments utilize the time domain for processing. To achieve this, the embodiments acquire and know the relative positions of all of its receivers to the same order of accuracy as the spatial resolution that is desired to detect and characterize. This can be achieved using, for example, the GPS/GNSS location stamping together with the GPS/GNSS clocks that are available.

By having a transmitter module 107 that is surrounded by a plurality of receiver modules 109, the control module 105 can derive the position estimation from Time Difference Of Arrival (TDOA) measurements of the signals from the transmitter module scattered back from a target object.

For enhanced accuracy, GPS clocks can be used, which allows for direct measurement of the travel times. From this data the xyz coordinates of a point on the target object can be obtained. By measuring at a similar interval to the spinning/tumbling of a target object (e.g. due to the Yarkovsky effect), then the range resolution is better than the target size, which provides for indications of target size and shape.

To obtain such resolutions a certain bandwidth is required. According to some examples, the electromagnetic signal transmitted from a transmitter module 107 is modulated with a random amplitude over a time period, which by then cross correlated the received signal with the transmitted signal can deliver the detection of target resolution. The selected time duration and bandwidth set the signal-to-noise ratio, which can be chosen, for example, to be about 30 dB above the electronic noise level of a receiver module 109. At a signal-to-noise ratio of 30 dB, range resolutions greater than 10 times that at the required Nyquist interval can be obtained, or better than a tenth of the smallest wavelength in the transmitted sequence, giving resolutions of about 3 cm.

According to one embodiment, the spacing of the receiver modules 109 is configured such that the time difference between received signals from a target object at range R is measurable, which for example is of the order of about a wavelength. For example, for a range of 100 km, the receiver modules 109 can be configured to be spaced about 200 m apart in the array of receiver modules. In one example, the system exploits the near field; for example whereby a transmitter module 107 is surrounded by a pseudo-circular and/or randomized array of at least 10 receiver modules 109 over a radius of 200 m. A greater number of receiver modules can be used to characterize the virtual aperture, which in turn improves the dynamic range.

On reception, the cross-correlation will have peaks separated in time and corresponding to different targets. Individual peaks show a structure coming from the target resolvable characteristics. The duration of the transmitted sequence will be governed by the overlaps of transmitted and received sequences.

Figure 6:
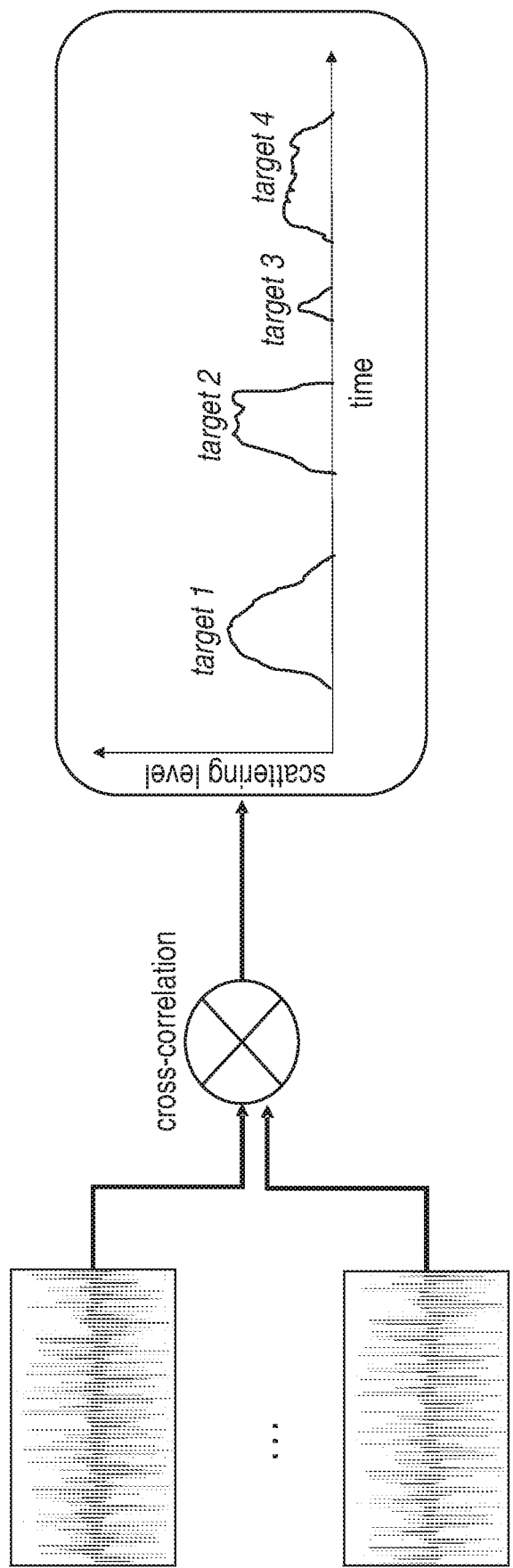
FIG. 6 shows an example of how cross-correlation may be used in an embodiment.

For example, referring to FIG. 6 which shows received signals being cross-correlated to identify targets (e.g. targets 1-4 in the example), responses from different targets will have amplitudes related to the multi-aspect scattering strength of each target. Individual peaks show a structure coming from the target resolvable characteristics. This will include small-scale variations in either the surface roughness or the intrinsic reflectivity of each target. These responses will last for times corresponding to the spatial dimensions of each target across the imaging beam (this will vary as different transmitter-receiver configurations are used, with ranges and therefore different beamwidths at the target). The duration of the transmitted sequence will be governed by the overlaps of transmitted and received sequences, associated to the different ranges from transmitter(s) to the target and from target to receiver(s).

As can be seen from the above, the embodiments described herein provide an antenna method and apparatus for electromagnetic imaging and surveying which disposes a plurality of electromagnetic receivers and at least one transmission source in a selected pattern in the orbit of the earth, that can help detect and better track the growing amount of debris in space, with high location resolution and structural definition.

The antenna formed by the plurality of receivers described in the embodiments herein utilizes an array of accurately positioned and controlled nano-satellites to create an adaptive, dynamically positioned set of sensors and electromagnetic transmission source/sources. The sources are repeatedly actuated proximate to the electromagnetic receivers. Signals generated back to the receivers, indexed in time with respect to each actuation of at least one electromagnetic energy source, are recorded and processed in real time by individual processors, which may be co-located for example within the antenna elements. This convolves into discrete imagery.

The satellite constellation making up the array of satellite nodes described above, and in turn the antenna, may be comprised of any sized satellites, including nano-satellites. Applications beyond GEO are possible with the same technique, albeit at lower resolution; asteroid and planetary investigations (e.g. close to planetary asteroid belts) can be facilitated with the addition of bespoke positioning networks of small satellites.

According to another embodiment, there is provided a system for assessing objects in space. The system comprises an array of satellite nodes, wherein the array of satellite nodes comprise at least one transmitter module for transmitting an electromagnetic signal, and a plurality of antenna elements for receiving diffractions from electromagnetic waves scatted from objects in space. The system comprises a control module for controlling the plurality of antenna elements to receive diffractions from a focussed virtual aperture in space. An imaging module is configured to assess a target object based on the signals received from the plurality of antenna elements.

According to another embodiment, there is provided an imaging system for imaging objects in space. The imaging system comprises an array of satellite nodes, wherein the array of satellite nodes comprise at least one transmitter module for transmitting an electromagnetic signal, and a plurality of receiver modules for receiving diffractions from electromagnetic waves scatted from objects in space. The system comprises an imaging unit for generating an image of a target object from the diffractions received at the plurality of receiver modules.

According to another embodiment, there is provided a system for assessing objects in space. The system comprises an array of satellite nodes, wherein the array of satellite nodes comprise at least one transmitter module for transmitting an electromagnetic signal, and a plurality of antenna elements for receiving diffractions from electromagnetic waves scatted from objects in space. The system comprises a control module for controlling the plurality of antenna elements to receive diffractions from a focussed virtual aperture in space, and an imaging module to assess a target object based on the signals received from the plurality of antenna elements. The system comprises a dynamic beamformer that is adaptively configured to sweep into data virtual pencil beams to form imagery from received signals.

Figure 7:
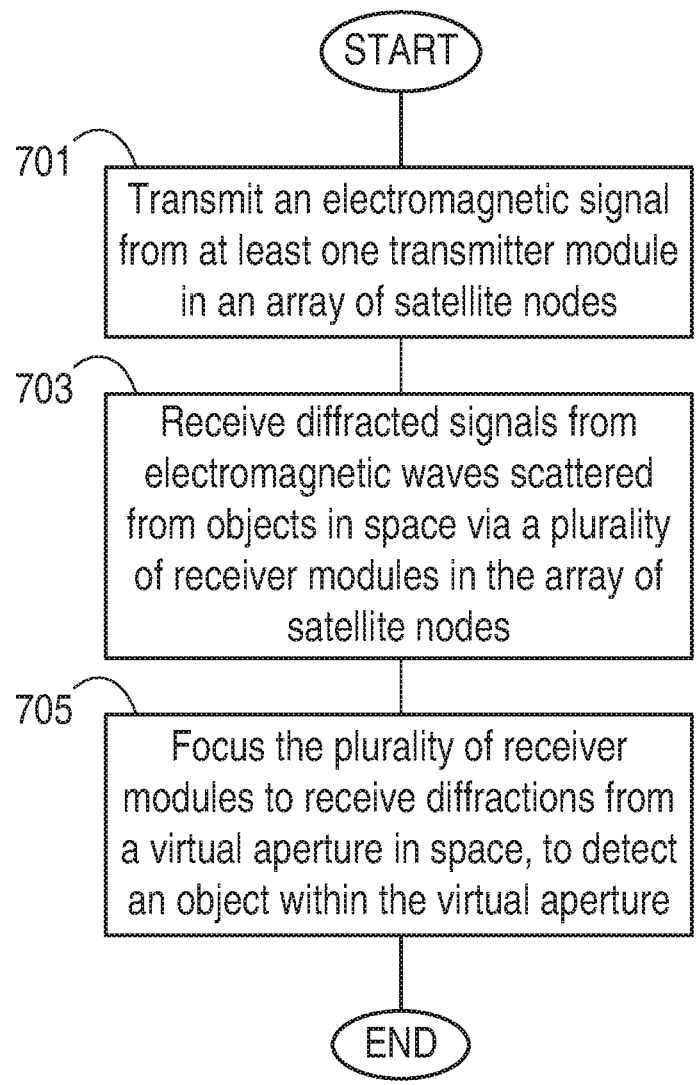
FIG. 7 shows an example of a method according to an embodiment.

FIG. 7 shows a method according to another embodiment, for detecting objects in space using an array of satellite nodes $101_1$ to $101_N$. The method comprises transmitting an electromagnetic signal from at least one transmitter module in the array of satellite nodes, step 701. The method comprises receiving diffracted signals from electromagnetic waves scattered from objects in space via a plurality of receiver modules 109 in the array of satellite nodes, step 703. The method comprises focussing the plurality of receiver modules to receive diffractions from a virtual aperture in space, step 705, to detect an object within the virtual aperture.

In one embodiment, a dynamic beamformer adaptively sweeps into data virtual pencil beams to form imagery from data received from the plurality of receiver modules.

The method may comprise controlling the position of a plurality of satellite nodes within the array of satellite nodes, relative to one another, for example dynamically or adaptively. For example, the method may comprise dynamically controlling the relative positions of the plurality of satellite nodes during a transmit and/or receiver operation.

The method may comprise adaptively tuning the array of satellite nodes such that the plurality of receiver modules are focussed towards the virtual aperture for monitoring a specific area within a larger object field in space.

The method may comprise sweeping the virtual aperture through the larger object field. Sweeping the virtual aperture may comprise sweeping the virtual aperture to follow a tracking pattern. The pattern of the sweep can be dynamically controlled in relation to image data previously received and processed.

The method may further comprise tracking a target object that has been detected in the virtual aperture.

In some examples the method comprises actuating the at least one transmitter module periodically, and controlling the plurality of receiver modules such that signals received at the plurality of receiver modules are indexed in time with respect to each actuation of the at least one transmitter module.

The method may comprise receiving time indexed signals from the plurality of receiver modules, and processing the received signals to form an image of a target object using position information relating to the at least one transmitter module and plurality of receiver modules.

The method may comprise collecting observation vectors from the target object. The observation vectors may be used to generate a target object profile, wherein the target object profile comprises one or more of: at least one orbital parameter of the target object; a detection-scatter signature of the target object; an intrinsic rotation of the target object; a tumbling rate of the target object. The target object profile may be based on a radial velocity, amplitude and phase of the inherent spectral components of the target object.

According to some embodiments the method comprises controlling a propulsion module to change the position of one or more satellite nodes of the array relative to one or more other satellite nodes of the array, and/or to change the relative position of the array as a whole in relation to a target object.

Further details will now be provided in relation to an example of how the various signals may be handled.

In one embodiment the signal processing method images the projection of a wavelet on observed trace data using a scattering model (for example Born approximation). The step of analyzing a wavelet may comprise incorporating a radiation pattern (true amplitudes and phases) of scattering matrix elements. Examples of simple radiation patterns include isotropic scattering emphasizing non-specular returns (pure diffractions), or "Edge" diffractions with 180° phase shift (polarity reversal) orthogonal to strike direction of fault.

In contrast to conventional imaging, the image delivery according to embodiments described herein comprises the steps of creating detailed maps of the scattering volume in the area near-field and far-field vicinity reached by the receiver array footprint. As such, each cell/voxel is interrogated for its scattering strength (i.e. scattering cross-section) and a 3D debris map is generated, for example based on a statistical and adaptive beamforming processing approach.

Given that sub-wavelength scale scattering is a frequency dependent phenomenon, the imaged scattering volume is implicitly frequency dependent. Consequently, the computational domain is discretized, for example at a minimum of 4 points per wavelength (ppw) at the highest frequency, to allow for sufficient sampling. Other points per wavelength may also be used.

With regard to analyzing the signals per se, known techniques may be used, such as Green's function representation for electromagnetic fields and waves between points. As stated in literature the causal electric field Green's function can be obtained together with its time-reversed counterpart. In addition, the embodiments described herein can support the use of the electromagnetic reciprocity theorem of the time-convolution type, which leads to the causal Green's function without constraints on the loss mechanisms.

Once the computational grid is established, the Green function associated with the wave equation and the implicit propagation and velocity model is computed at each grid point. That is, each node in the discretized volume is assumed to be an isotropic radiator/source. This stage of the processing workflow can be handled in parallel, since computation of the Green function at any given node is completely independent of any other node.

The modelling for these computations can be obtained from the known orbital time references mentioned earlier in the application, and this may be handled, for example, on a satellite dedicated in orbit to handle the processing and computations feeding back to a ground based observatory as post processed responses. In such an embodiment a particular satellite may be selected for performing the difficult data processing (for example a larger satellite), such that the array may comprise different sized satellites, e.g. one larger satellite which performs such processing intensive tasks, with an array or swarm of smaller satellites used as receivers. Another option is to use distributed computing among an array of smaller satellites which handle different parts of the processing (and whereby some tasks are performed in parallel by different satellite nodes. Another option is to send selected portions of the dataset to a land-based high-performance computing facility, allowing for possible return of most relevant parameters to the satellite array or swarm.

The beamformer utilized by embodiments described herein may start as a typical phase coherent summation technique, with its operator between the space of all recorded data. At each location of interrogation sub-volume, the beamformer uses adaptive filters and a sum stage (as will be described later) to interrogate predefined small volumes of space.

According to some embodiments, a dynamic artificial intelligence beamformer may be used, which relies on a set of focussing laws, which correct for errors in propagation path and travel time estimations. The embodiments can employ either correlation, or eigenvalue, or maximum power based corrections to the travel time propagation estimations (i.e. maximal focus). Once the data from multiple aspects has been gathered, a dynamic virtual beamformer may be configured to sweep into the data, and create virtual pencil beams from which high-resolution imagery can be formed.

To tackle the effect of noise on the signals, given that the signals may encounter an interfering environment or have to deal with noisy signals in the processing or beamforming of the signals, then linear interpolation of discretely sampled recorded signals may be performed.

For example, a linear interpolation method may be used, that preserves the underlying signals, and although the interpolated value departs from the 'pure' signal value in proportion to the strength of the noise field, the underlying signal amplitudes can be recovered by sufficiently stacking beamformer voxel contribution count as the embodiments transmit and receive multiple times, and from different orbit positions, which forms a synthetic moving antenna pattern leading to multi-aspect views of the target field. Hence, the embodiments can use a linear interpolation scheme to preserve the signal content, which is recoverable against noise interference through coherent summation.

Figure 8B:
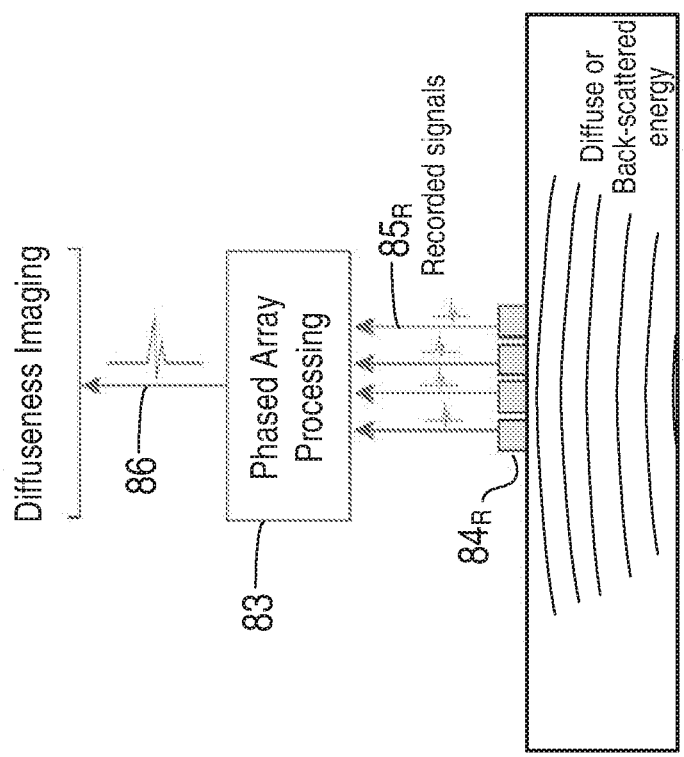
FIG. 8b shows an example of a receiver part of an embodiment.
Figure 8A:
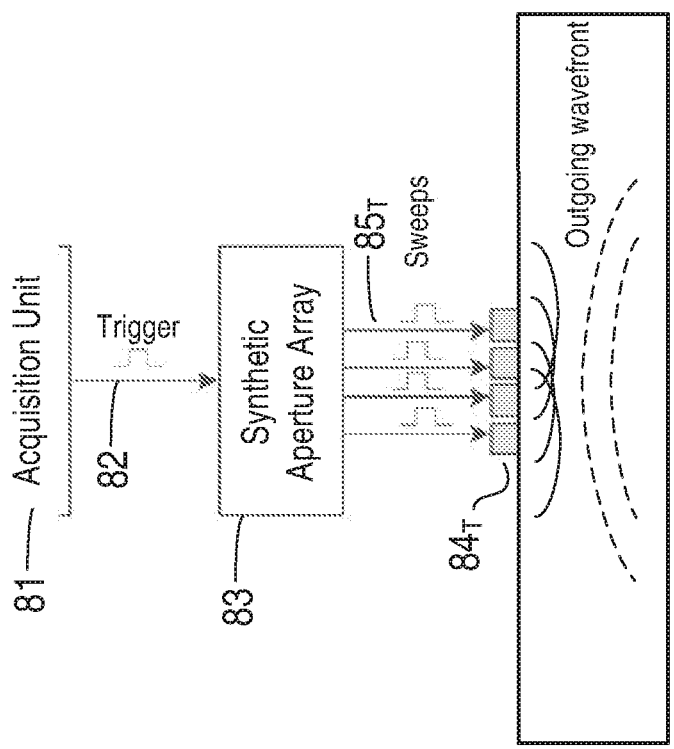
FIG. 8a shows an example of a transmitter part of an embodiment.

FIG. 8a shows an example of a transmission part of an embodiment, whereby one or more satellite based transmitters $84_T$, located on one or more satellite nodes forming an array of such satellite nodes, are provided for generating an outgoing waveform. An acquisition unit 81 provides a trigger signal 82 to a control module 83 that is adapted to control the array of transmitters $84_T$ to provide a synthetic or virtual aperture, using one or more transmission signals $85_T$ that control the array comprising one or more transmitters $84_T$.

FIG. 8b shows an example of a receiver part of an embodiment, whereby one or more satellite based receivers $84_R$, located on one or more satellite nodes forming an array of such satellite nodes, are provided for receiving diffused or backscattered energy from target objects or debris. A control module 83 is adapted to perform phased array processing of the received signals $85_R$ received from the array comprising one or more receivers $84_R$, to provide a signal 86 representing the detected objects or debris, which may be used for image analysis.

The control module 83 of FIGS. 8a and 8b may correspond to the control module 105 of FIG. 2a, and similarly the one or more transmitters $84_T$ may correspond to the transmitter modules 107 mentioned in previous embodiments, while the one or more receivers $84_R$ may correspond to the receiver modules 109 mentioned in previous embodiments.

Figure 8C:
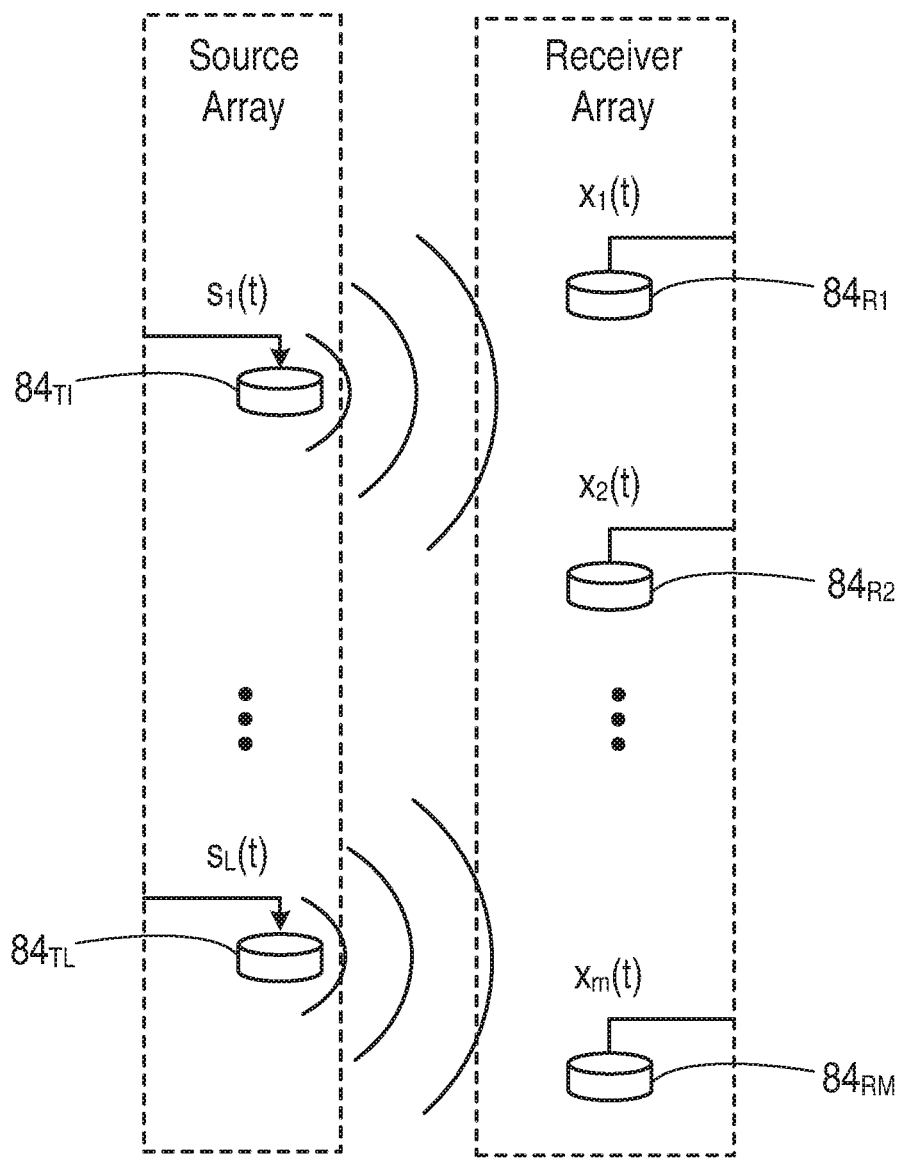
FIG. 8c shows an example of a source array and a receiver array of an embodiment.

FIG. 8c shows a source array comprising a plurality of electromagnetic sources $84_{T1}$-$84_{TL}$ which may be provided on a plurality of satellite nodes forming part of the satellite array, and a receiver array comprising a plurality of receivers $84_{R1}$-$84_{RL}$ which may be provided on a plurality of satellite nodes forming part of the satellite array.

Figure 9:
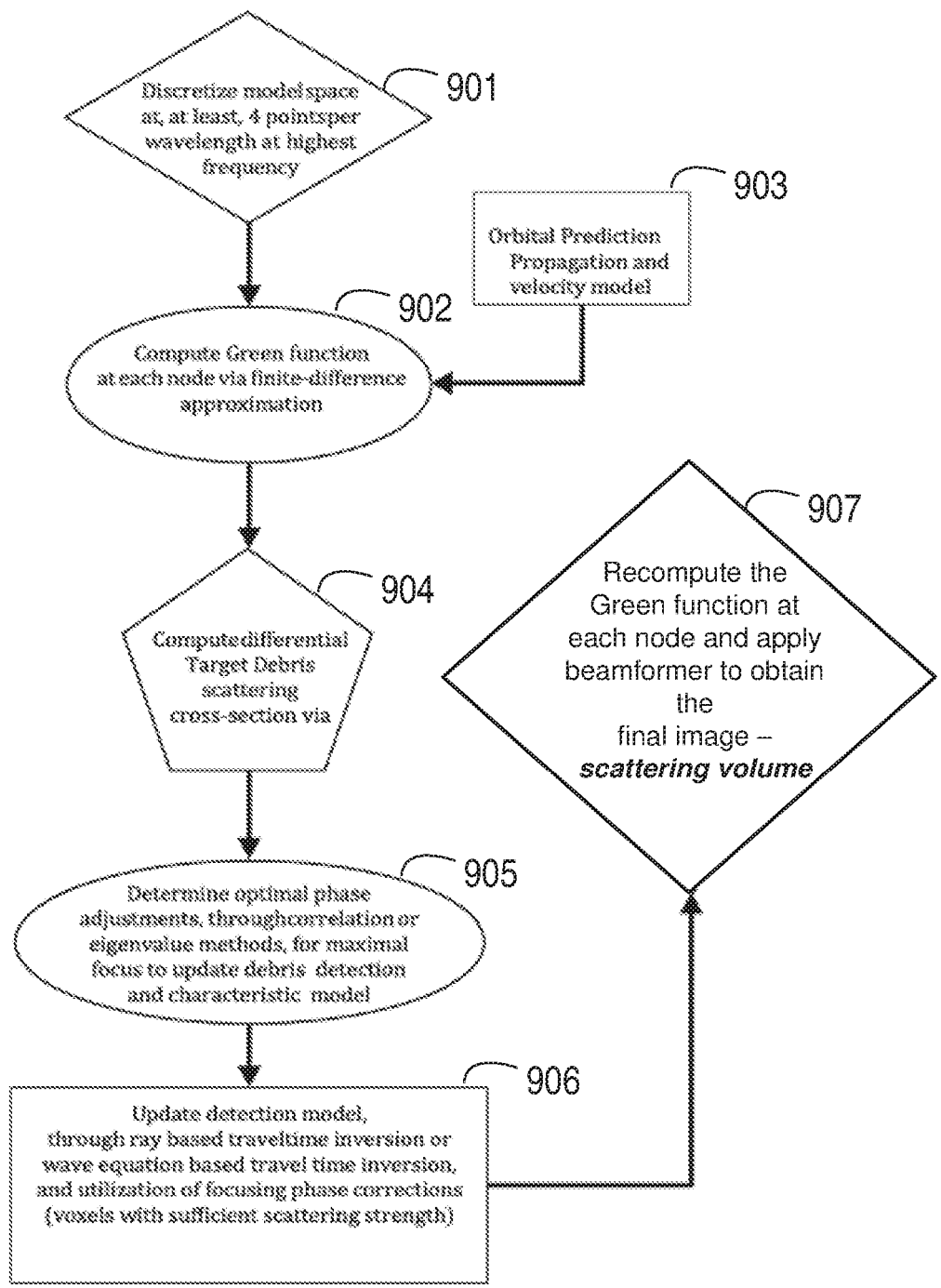
FIG. 9 shows an example of another method according to an embodiment.

FIG. 9 shows an example of a method according to another embodiment. In step 901 the model space is discretized, for example to at least 4 points per wavelength at the highest frequency. In step 903 a Green function is computed at each node, for example using finite-difference approximation. This may involve the use of orbital prediction propagation and velocity modelling, 903.

In step 904 differential target debris scattering cross-section is computed. The optimal phase adjustments are then determined in step 905, for example using correlation or eigenvalue methods, for maximal focus, to update the debris detection and characteristic models.

In step 906 the detection model is updated, for example though ray based travel time inversion, and utilization of focusing phase corrections (voxels with sufficient scattering strength).

The Green function is then recomputed at each node and applied to the beamformer to obtain a final image, step 907, representing the scattering volume (i.e. where the space debris or object is located).

Figure 10:
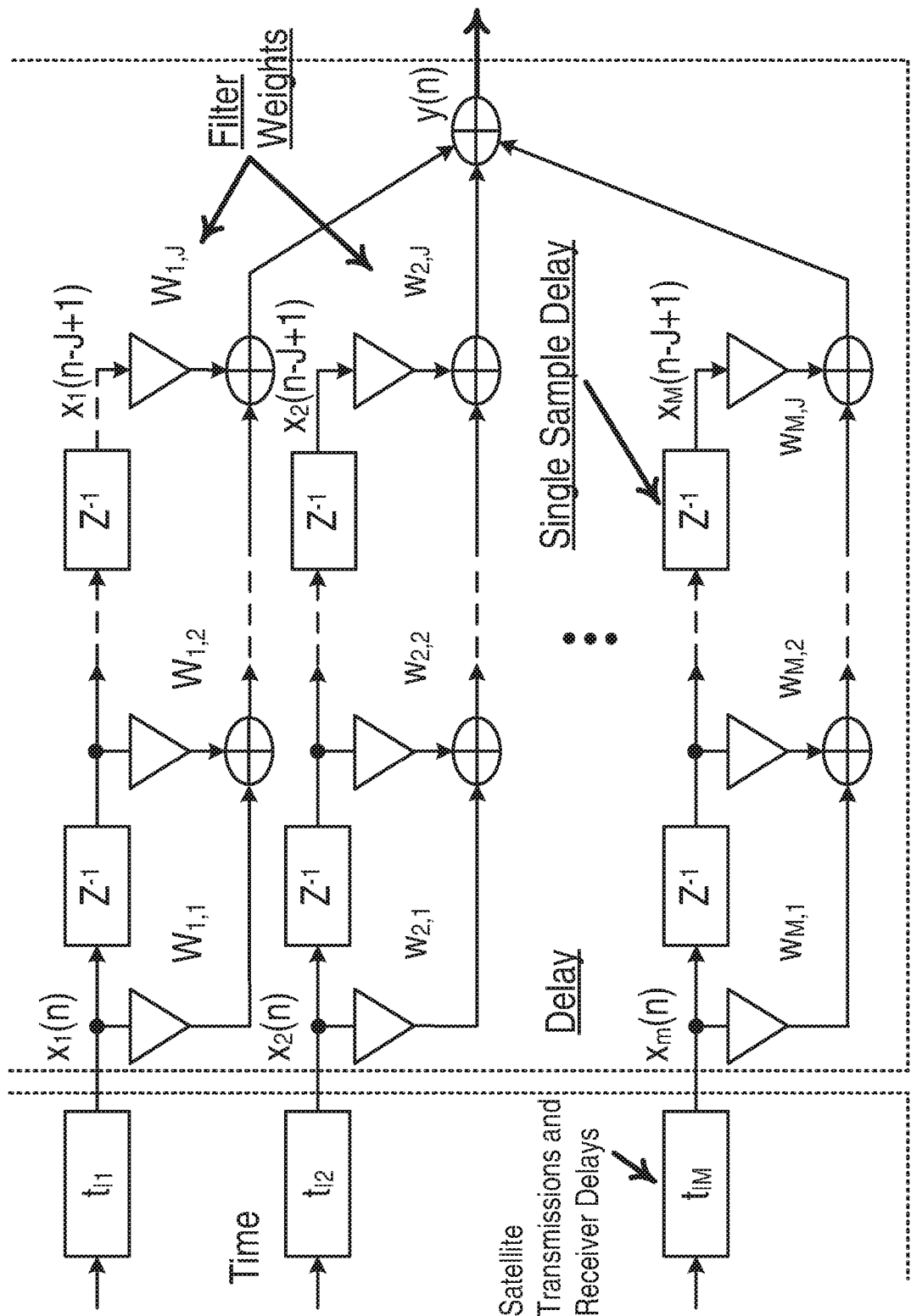
FIG. 10 shows an example of an adaptive filter and sum stage according to an embodiment.

The adaptive and dynamically changing smart electromagnetic signal processing beamformer according to embodiments described herein may comprise a multi-stage interrogating delay and filter architecture, for example as shown in FIG. 10. The first stage is the delay ($t_{T1}$ to $t_{TM}$) for each source-receiver pair that synchronizes the arrival times of a signal scattered from the debris point at a particular location or position in orbit.

The delayed signal may be summed with filter weights being equal, thus making the output a simple delay and sum beamformer. The beamformer can maximize the signal in a particular direction or in a particular volume element (voxel).

However, according to embodiments of the electromagnetic beamformer described herein in FIG. 10, the delayed signal can be multiplied by filter weights W and then summed. The type of filter weights can be chosen or assigned through a dynamic form of cause and effect, leading to a more optimized beamformer to help focus on the debris field and separate and characterize separate targets.

When the filter coefficients are defined at a particular exact time stamp which runs through and controls the synchronization of all the satellite based receivers and transmitters forming whatever permutation in orbit of the antennae pattern, this results in a set of appropriately delayed times from the delay stage, thus enabling the filter to become a customized spatial filter.

Through the provision of artificial intelligence and neural network with learning algorithms as part of the beamformer architecture, the embodiments can dynamically provide a responsive feedback loop with weights in the beamformer assigned or chosen to minimize the output power from strong specular reflections or noise outside the debris field look direction, while maintaining the signal gain in the look direction onto specific debris scattering or diffractions resulting in the invention's novel evolving electromagnetic signal based beamformer resembling a minimum variance distortionless response filter.

Additional stages of filtering may be adaptively created, for example by using constrained least mean square algorithms. The adaptiveness of the embodiments described above creates a filter bank on each satellite receiver, to shape both the spatial and frequency response.

As noted above, once the data from multiple aspects has been gathered, it is possible to dynamically create a virtual beamformer and sweep into the data, creating virtual pencil beams from which high-resolution imagery can be formed. As such, the functionality of the dynamic beamformer can adaptively customise the beamformer and sweep into the data virtual pencils beams, hence imagery can be formed of the space debris or objects.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A system for detecting objects in space, the system comprising:
   an array of satellite nodes, wherein the array of satellite nodes comprises:
      at least one transmitter module for transmitting an electromagnetic signal;
      a plurality of receiver modules for receiving diffractions from electromagnetic waves diffracted from objects in space, the objects including a target object; and
   a control module for focussing the plurality of receiver modules to receive diffractions from a focussed virtual aperture in space, wherein the control module is configured to:
      apply spatial filters configured to suppress specular reflections coming off the target object; and
      process the received diffractions, with the reflection suppression spatial filters applied, to form an image of the target object.

2. The system as claimed in claim 1, wherein the control module comprises a dynamic beamformer that is adaptively configured to sweep into data virtual pencil beams to form imagery from data received from the plurality of receiver modules.

3. The system as claimed in claim 1, wherein an individual satellite node within the array of satellite nodes comprises:
   a transmitter module; or
   a receiver module; or
   a transceiver module; or
   a plurality of transmitter modules and/or receiver modules.

4. The system as claimed in claim 1, wherein the control module is configured to control positions of a plurality of satellite nodes within the array of satellite nodes, relative to one another.

5. The system as claimed in claim 4, wherein the control module is configured to dynamically control the relative positions of the plurality of satellite nodes.

6. The system as claimed in claim 1, wherein the control module is configured to adaptively tune the array of satellite nodes such that the plurality of receiver modules are focussed into a specific area within the field of view of the individual antennas based on the diffractions, the specific area defining the virtual aperture within a larger object field in space.

7. The system as claimed in claim 6, wherein the control module is configured to control the array of satellite nodes to sweep the virtual aperture through the larger object field.

8. The system as claimed in claim 7, wherein the control module is configured to sweep the virtual aperture such that it follows a tracking pattern.

9. The system as claimed in claim 7, wherein the pattern of the sweep is dynamically controlled in relation to image data previously received and processed.

10. The system as claimed in claim 1, wherein the control module is configured to track a target object that has been detected in the virtual aperture.

11. The system as claimed in claim 1, wherein the control module is configured to actuate the at least one transmitter module periodically and control the plurality of receiver modules such that signals received at the plurality of receiver modules are indexed in time with respect to each actuation of the at least one transmitter module.

12. The system as claimed in claim 11, wherein the control module receives time indexed signals from the plurality of receiver modules and processes the received signals to form an image of a target object, using position information relating to the at least one transmitter module and plurality of receiver modules.

13. The system as claimed in claim 12, wherein the time indexed signals are processed to generate an image corresponding to at least one point of interest on the target object.

14. The system as claimed in claim 10, wherein the control module is configured to collect observation vectors from the target object.

15. The system as claimed in claim 14, wherein the control module is configured to use the observation vectors to generate a target object profile, wherein the target object profile comprises one or more of:
   at least one orbital parameter of the target object;
   a detection-scatter signature of the target object;
   an intrinsic rotation of the target object; and
   a tumbling rate of the target object.

16. The system as claimed in claim 14, wherein the target object profile is based on a radial velocity, amplitude and phase of the inherent spectral components of the target object.

17. The system as claimed in claim 15, wherein the control module is configured to periodically update a target object profile to monitor the character of the target object as it evolves in time.

18. The system as claimed in claim 1, wherein each of the satellite nodes comprises a propulsion module to change positions of the satellite nodes relative one another in the array, and/or to change a relative position of the array as a whole in relation to a target object.

19. The system as claimed in claim 1, wherein the satellite nodes comprise nano-satellites, or CubeSat satellites.

20. The system as claimed in claim 1, wherein the array of satellite nodes is positioned in lower earth orbit, LEO, or Geosynchronous Orbit, GEO, or any combination of suitable orbits around a planetary body or set of bodies.

21. A system for assessing objects in space, the system comprising:
   an array of satellite nodes, wherein the array of satellite nodes comprises at least one transmitter module for transmitting an electromagnetic signal, and a plurality of antenna elements for receiving diffractions from electromagnetic waves diffracted from objects in space, the objects including a target object;
   a control module for controlling the plurality of antenna elements to receive diffractions from a focussed virtual aperture in space, wherein the control module is configured to apply spatial filters configured to suppress specular reflections coming off the target object; and
   an imaging module to assess the target object based on the diffractions received from the plurality of antenna elements and to form an image of the target object using the received diffractions with the reflection suppression spatial filters applied.

22. The system as claimed in claim 1, wherein the control module is configured to process the received diffractions to form an image of a target object using position information relating to the at least one transmitter module and plurality of receiver modules.

* * * * *